Nov. 8, 1966 J. N. COOPER 3,284,084
TAPE EDITING MACHINE
Filed Oct. 20, 1965
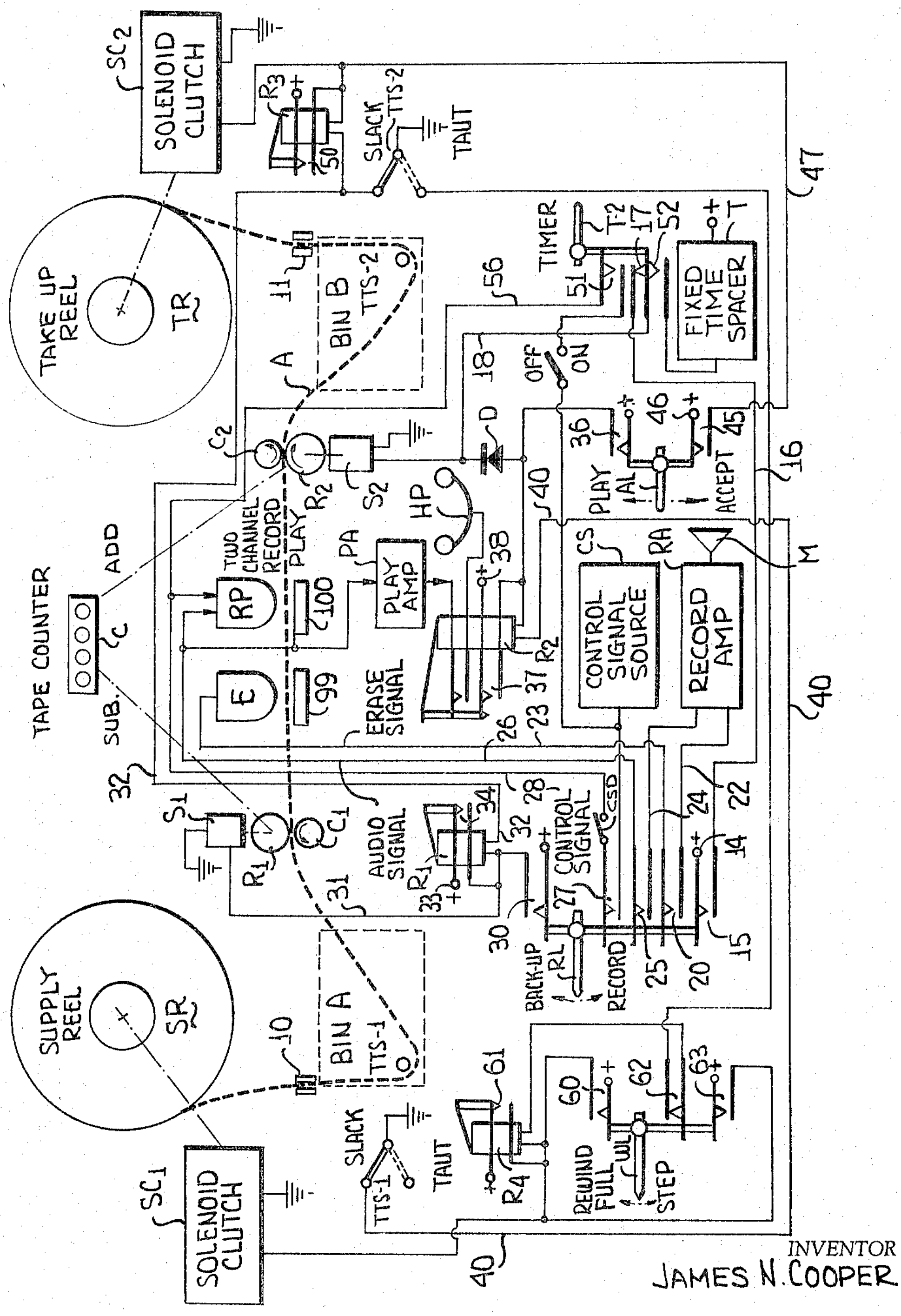
INVENTOR
JAMES N. COOPER
BY Hurvitz & Rose
ATTORNEYS United States Patent Office 3,284,084
Patented Nov. 8, 1966

3,284,084
TAPE EDITING MACHINE

James N. Cooper, Hyattsville, Md., assignor of one-third to Hyman Hurvitz, Washington, D.C.

Filed Oct. 20, 1965, Ser. No. 498,582
15 Claims. (Cl. 274—11)

This application is a continuation-in-part of my prior applications Serial No. 317,840, filed October 21, 1963, entitled Teaching Machine, now Patent No. 3,234,666; Serial No. 381,386, filed July 9, 1964, entitled Language Teacher, assigned to the same assignee as this application.

The present invention relates generally to tape recorders and more particularly to systems for recording multiple spaced items of random durations on a tape, providing facility for reviewing and at will discarding each item immediately following recording.

Magnetic recordings used in language training, speech therapy, and the like, are often required to be produced at will to have characteristics specific to a given organization or use. For example, a language teacher may desire to record plural items, i.e. selected syllables, words, sentences, for use by her pupils, in conformance with her own pedagogic ideas. This procedure has heretofore presented difficulty because incorrectly spoken items inevitably occur, which must be erased, and each item should preferably be reviewed immediately on recording. Review requires precise feedback of tape, and if the item is satisfactory precise feed forward to a proper position for recording a succeeding item, which in turn consumes an inordinate amount of time and requires experience and patience.

It is an object of the present invention to provide a novel system of recording, with review of each item, plural spaced items of random lengths, on a magnetic tape.

The above and still further objects, features and advantages of the present invention will become apparent upon consideration of the following detailed description of one specific embodiment thereof, especially when taken in conjunction with the accompanying drawing, wherein:

The single figure is a schematized diagram of a tape recorder-reproducer according to the invention.

In the figure SR is a supply reel and TR a tape-up reel for a tape A. Tape feeds from supply reel SR via pressure pads 10, through bin A, past continuously running capstan C1 and roller R1 operated by solenoid S1, past erase head E, two channel record play head RP, past capstan C2 and roller R2, through bin B, via pressure pads 11 to take up reel TR. The supply reel SR and the take-up reel TR are driven from belts or motors (not shown) via solenoid clutches SC1 and SC2.

To record an item, record lever RL is depressed. Power proceeds from terminal 14, now closed contacts 15, line 16, normally closed contacts 17, line 18 and solenoid S2, which actuates roller R2 toward capstan C2. Tape is pulled into bin B past record-play head RP. That bin contains a tape tension switch TTS–2 about which the tape is pulled, and which is actuated to slack tape condition as tape moves into the bin B.

Contacts 20 close, which provides erase signal from record amplifiers RA via leads 22, 23 to erase head E. Record amplifier RA has an associated microphone M, which supplies voice or audio signal via lead 24, contacts 25, lead 26 to one record channel of record play head RP. Simultaneously a control signal is fed from control signal source CS via contacts 27 and lead 28 to the other one of record heads RP. The tape is two track and accordingly voice and control signals are recorded together, on separate tracks, and the recorded tape fed into, or at least toward bin B. If desired the control signal source CS can be disabled by switch CSD, making the control track available for other purposes.

When the item, with or without parallel control signal, is recorded, lever RL is pushed to back-up position transiently, opening contacts 15, 20, 25, 27 and closing contacts 30. A circuit is now completed via lead 31 to solenoid S1. In addition relay RL is energized, finding a ground via lead 32 and through slack tape switch TTS–2. Relay RL latches itself from terminal 33, contacts 34, and feedback of tape proceeds until switch TTS–2 is caused to move to taut position, signaling that bin B has a taut tape. At this point circuit to ground for relay RL is broken, and solenoid S1 de-energizes and the tape is now back precisely in its original position. Counter C is coupled to roller R2 for add and to roller R1 for subtract, and therefore should now read zero.

The next action requires playback of the item to determine its suitability. Lever A1 is pushed up, closing contacts 36 and providing current via diode D to solenoid S2. The tape, in being pulled back has been stored in bin A, and switch TSS–1 therein is now in slack position. The tape now feeds from bin A into bin B.

Current is also supplied to relay R2, causing it to latch at its contacts 37 from power terminal 38, the relay finding a ground via lead 40 and slack tape switch TTS–1, until the latter closes, signaling that all tape has been transferred from bin A to bin B, at the same time a circuit is closed from play head RP, to play amplifier PA, now closed contacts 41 and headphones HP. When tape tautens in bin A, play amplifier PA output is disconnected from headphones HP because relay R2 is disabled, and solenoid R2, which after transient closure of switch 36 is energized via contacts 37 or relay R2, is de-energized. Tape feed stops, and the recorded item has been reviewed. If desired, by manipulation of back-up lever RL and play lever AL, the review operation can be repeated.

At this point, either the item is acceptable and is to be stored, or it is not acceptable and is to be discarded. If to be discarded, back-up is resorted to with succeeding "record" of a replacement item, by operating lever RL. If the item is acceptable, lever AL is moved to "accept" position, contacts 45 are closed, supplying current from terminal 46 to lead 47 and solenoid clutch SC2. The takeup reel TR operates, pulling the tape stored in bin B into reel TR. Relay R3 also operates, and latches via its contacts 50, which in latched position supply current to solenoid clutch SC2 and maintain its operation. Ground for relay R3 is supplied via slack switch TTS–2, and is removed when that switch goes to taut condition, terminating the operation.

It is now necessary to insert a fixed space after the item, say one-half or one second of tape. This is done by pushing down lever TL, opening contacts 17 and closing contacts 51 and 52. Closure of contacts 52 initiates generation of a one half second pulse from timer T, preferably a clock, the pulse proceeding via lead 18 to solenoid S2 and feeding tape into bin B. If switch 55 is closed, control signal can proceed from control signal source CS and via contacts 51 and lead 56 to record head RP, but if not the fixed space is blank. At the end of the operation the accept lever AL is depressed, and the spacer section of tape is fed into tape up reel TR.

A rewind lever WL is provided. When pulled up contacts 60 are closed, supplying signal to latching relay R4, which latches itself energized and supplies current via contacts 61 to solenoid clutch SC1, operating supply reel SC, completely rewinding the tape. If it is desired to rewind a portion of the tape lever WL is depressed, opening contacts 62 and closing contacts 63.

Closing contacts 63 provides current for solenoid clutch SC1, but only while lever WL is depressed. Opening contacts 62 presents a ground circuit via switch TTS–2 for relay R2.

Contacts 62 open the circuit of relay R4 when tape has run out of bin B, moving switch TTS–2 to slack position.

Typically, use of tape counter C is not required, but occasionally the control switch RL is not operated as soon as voice terminates. In such case counter C facilitates correction.

The precise positions of capstans C1 and C2 are not illustrated, for convenience. They are in fact positioned at entrances to bins A and B, so that they may push tape into the entrances. The correct technique is illustrated in my prior applications above referred to.

Pressure pads 10, 11, maintain tape taut or slack, as the case may be, to assure correct operation of the system should the supply or take up reel be accidently moved, and pads 99, 100 maintain the tape A in contact with the heads E and RP.

In summary, the purpose of this device is to provide a means of making original master tapes without any necessity for editing by means of cutting, splicing and recopying.

The system has two capstans, C1 and C2, which run continuously and their associated pinch rollers, R1 and R2, are actuated by solenoid controls which cause forward and reverse motion of the tape.

With the tape in position extending from supply reel SR through bin A across erase and record play heads through bin B and to take upreel Tr, the following actions are required.

Set tape counter to zero. Back-up-record lever RL is held in "record" position which causes tape to be pulled from supply reel across heads during record of first portion of recording. Recorded tape is stored in bin B. A recording can be made only while lever RL is held in record position.

At the end of record of each item, switch lever RL is transiently operated to backup position, which pulls tape from bin B and stores it in bin A. Reverse action of the tape is stopped automatically by tape tension switch TTS–2 in bin B pulling to taut position.

The operator now operates lever AL in play position which pulls tape from bin A across head RP which is now in play mode and returns tape to bin B. Forward action of tape is stopped by tape tension switch TTS–1 in bin A. Tape when stopped is exactly in the same forward position as when recorded due to the action of TTS–1.

If the recorded material is not acceptable, tape is returned to bin A and a new recording made. When acceptable, switch lever TL is operated to add blank tape time between recorded segments as desired. Each transient operation of this switch adds one-half second tape time. Separate ON/OFF switch control from signal amplifier permits a signal control to be added to any portion of the blank tape.

After blank tape is added, switch lever AL is operated to accept position, which causes take up reel TR to pull finished portion of tape onto reel TR. This action is stopped automatically by action of tape tension switch TTS–2 when pulled to taut position.

Rewind switch has two positions, marked "Step" and "Full." In "Step" position the tape will be pulled back as long as lever WL is held down. In "Full" position the tape will be completely rewound to supply reel. Both supply and take up reels are operated by solenoid control clutches.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a stationary tape recorder of the type having a tape take up reel and a forward feed capstan tape drive and a reverse feed capstan tape drive, an erase head and a record play head, the combination comprising:
- a first tape bin located intermediate said supply reel and said reverse feed capstan drive,
- a second tape bin located intermediate said forward feed capstan drive and said take up reel, said tape being threadable in the order recited from said supply reel, through said first bin, past said reverse feed capstan, said erase head, said record play head, said forward feed capstan drive, through said second bin to said take up reel, wherein said forward feed capstan tape drive includes means operative while this take up reel is stationary to pull a predetermined length of said tape through said first bin and to push a corresponding length of said tape into said second bin, and wherein said reverse feed capstan drive includes means operative to pull said predetermined length of said tape from said second bin and to push a corresponding length of said tape into said first bin.

2. The combination according to claim 1 wherein is provided a first tape tension switch responsive to taut tape in said first bin to terminate feed of said tape from said first bin, and a second tape tension switch responsive to taut tape in said second bin to terminate feed of said tape from said second bin.

3. In a tape recorder of the type having a tape take up reel and a forward feed capstan tape drive, a reverse feed capstan tape drive, an erase head and a record-play head, the combination comprising:
- a first tape bin located intermediate said supply reel and said reverse feed capstan drive,
- a second tape bin located intermediate said forward feed capstan drive and said take up reel, said tape being threadable in the order recited from said supply reel, through said first bin, past said reverse feed capstan, said erase head, said record-play head, said forward feed capstan drive, through said second bin to said take up reel, wherein said forward feed capstan tape drive is arranged to pull tape through said first bin and to push tape into said second bin, and wherein said reverse fed capstan drive is arranged to pull tape from said second bin and to push tape into said first bin, wherein in provided a first tape tension switch responsive selectively to taut and slack tape in said first bin, and a second tape tension switch responsive selectively to taut and slack tape in said second bin, and wherein is further provided a microphone, switch means for at will energizing said forward feed capstan tape drive and simultaneously coupling said microphone to said record-play head, and means for at will disabling said switch means and energizing said reverse feed capstan tape drive, and means including said second tape tension switch for automatically terminating tape feed when said tape is taut in said second bin.

4. In a tape recorder of the type having a tape take up reel and a forward feed capstan tape drive and a reverse feed capstan tape drive, an erase head and a record-play head, the combination comprising:
- a first tape bin located intermediate said supply reel and said reverse feed capstan drive,
- a second tape bin located intermediate said forward feed capstan drive and said take up reel, said tape being threadable in the order recited from said supply reel, through said first bin, past said reverse feed capstan, said erase head, said record-play head, said forward feed capstan drive, through said second bin to said take up reel, wherein said forward feed capstan tape drive is arranged to pull tape through said first bin and to push tape into said second bin, and wherein said reverse feed capstan drive is arranged to pull tape from said second bin and to push tape into said first bin, wherein is provided a first tape tension switch responsive selectively to taut and slack tape in said first bin, and a second tape tension switch responsive selectively to taut and slack tape in said second bin, wherein is further provided a microphone, switch means for at will energizing said forward feed capstan tape drive and simultaneously coupling said microphone to said record-play head, and means for at will disabling said switch means and energizing said reverse feed capstan tape drive, and means including said second tape tension switch for automatically terminating tape feed when said tape is taut in said second bin, wherein is further provided means for at will energizing said forward feed capstan tape drive, and means including said first tape tension switch for disabling said forward feed capstan tape drive when said tape is taut in said first bin.

5. In a tape recorder of the type having a tape take up reel and a forward feed capstan tape drive and a reverse feed capstan tape drive, an erase head and a record-play head, the combination comprising:

a first tape bin located intermediate said supply reel and said reverse feed capstan drive, a second tape bin located intermediate said forward feed capstan drive and said take up reel, said tape being threadable in the order recited from said supply reel, through said first bin, past said reverse feed capstan, said erase head, said record-play head, said forward feed capstan drive, through said second bin to said take up reel, wherein said forward feed capstan tape drive is arranged to pull tape through said first bin and to push tape into said second bin, and wherein said reverse feed capstan drive is arranged to pull tape from said second bin and to push tape into said first bin, wherein is provided a first tape tension switch responsive selectively to taut and slack tape in said first bin, and a second tape tension switch responsive selectively to taut and slack tape in said second bin, wherein is further provided a microphone, switch means for at will energizing said forward feed capstan tape drive and simultaneously coupling said microphone to said record-play head, and means for at will disabling said switch means and energizing said reverse feed capstan tape drive, and means including said second tape tension switch for automatically terminating tape feed when said tape is taut in said second bin, wherein is further provided means for at will energizing said forward feed capstan tape drive, means including said first tape tension switch for disabling said forward feed capstan tape drive when said tape is taut and in said first bin, and wherein is further provided means for removing only slack tape from said second bin to said take up reel.

6. In a tape recorder, a tape supply reel, a first bin, a first capstan drive for pushing said tape into said first bin, an erase head, a record and play head, a second capstan drive, a second bin, said further capstan being arranged to push said tape into said second bin, and a take up reel, the tape being threadable in the sequence tape supply reel, first bin, first capstan drive, erase head, record and play head, second capstan drive, second bin and take up reel, a first tape tension switch in said first bin, a second tape tension switch in said second bin, means including said second capstan drive for pulling a predetermined length of said tape past said record and play head while said head is in record condition and while pushing said tape into said second bin, means including said first capstan drive for pulling precisely said length of tape from said second bin and storing same in said first bin until said second tension switch is responsive to taut tape, means including said second capstan drive for pulling said predetermined length of tape from said first bin to said second bin with said record play head in play condition until said first tape tension switch is responsive to taut tape, and means for thereafter at will either transferring the tape stored in said second bin from said second bin to said take up reel or transferring said tape stored in said second bin from said second bin to said first bin.

7. In a tape recorder, a first bin, a second bin, a take up reel, means for recording on a random length of tape and simultaneously storing said length of tape in said second bin, means for thereafter transferring said length of tape from said second to said first bin, means for thereafter reading out the material recorded on said predetermined length of tape while transferring said length of tape from said first to said second bin, and means for thereafter at will either again transferring said length of tape from said second bin to said first bin preparatory to re-recording thereon and transferring said length of tape to said take up reel as acceptable material.

8. The combination according to claim 7 wherein is provided a tape tension means in each of said bins for terminating feed of tape therefrom in response to taut tape therein.

9. The combination according to claim 7 wherein is included means for at will introducing a fixed length of tape following each length of tape containing acceptable material and storing said fixed length of tape on said take up reel.

10. The combination according to claim 9 wherein is provided means for rewinding said tape in steps of predetermined length.

11. In a tape recorder system, means for recording on a random length of magnetic tape at random position within a tape reel while transiently storing the recorded random length of tape, said random length of tape having a random start position and a random terminate position, means for pulling back the recorded length of magnetic tape precisely to said start position, means reading out only said length of magnetic tape while again transiently storing the recorded tape, means automatically terminating operation of said means reading out when said tape attains said terminate position, means selectively operative at will for thereafter permanently storing said length of magnetic tape as accepted material or again pulling back said recorded length of magnetic tape precisely to said start position for re-recording.

12. The combination according to claim 11 wherein is included a first bin for transiently storing said length of tape transiently during pulling back and a second bin for transiently storing said length of recorded tape and of read out tape during recording and readout.

13. In a tape recorder system, a magnetic play and record head, a first bin, a second bin, a supply reel, a take up reel, first means feeding a random length of tape from said supply reel past said head while said head is in record condition and transiently storing said length of tape in said second bin, second means at will operative for transferring precisely and automatically said length of tape back from said second bin to said first bin while said reels are stationary, third means automatically transferring precisely said length of tape from said first bin to said second bin while said head is in play condition and said reels are stationary and fourth means for at will transferring precisely said length of tape from said second bin to said take up reel.

14. The combination according to claim 13 wherein is provided means responsive to a transient signal to effect a complete and automatic operation of said second means.

15. The combination according to claim 14 wherein is provided means for automatically terminating operation of said third means on completion of each transfer thereby of said length of tape from said first bin to said second bin.

References Cited by the Examiner

UNITED STATES PATENTS

| | | | |
|---|---|---|---|
| 2,632,061 | 3/1953 | Begun | 274—4 XR |
| 2,729,454 | 1/1956 | Vides | 274—11 XR |
| 2,905,767 | 9/1959 | Eckert et al. | 274—4 XR |

OTHER REFERENCES

Van Winkle: Tape Drive, IBM Technical Disclosure Bulletin, page 8, vol. 2, No. 2, August 1959.

NORTON ANSHER, *Primary Examiner.*

C. B. PRICE, *Assistant Examiner.*